Sept. 26, 1967  A. C. CAPPARELLA  3,343,232
SELF-LUBRICATING PINS
Filed Jan. 21, 1966
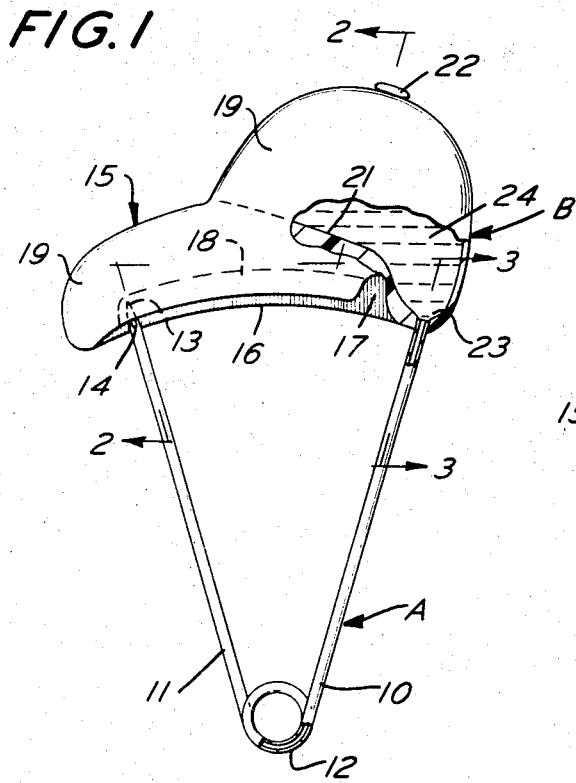
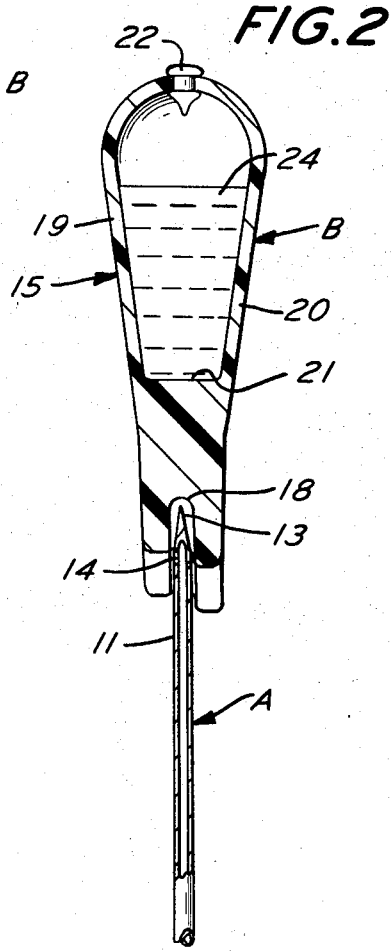
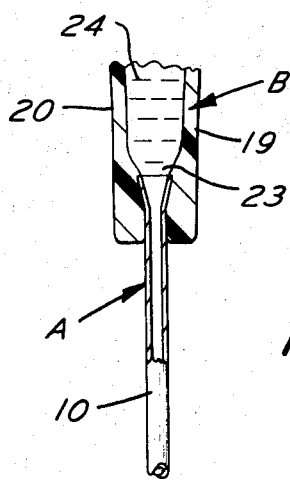
INVENTOR.
ANTHONY C. CAPPARELLA
BY
ATTORNEYS.

United States Patent Office 3,343,232
Patented Sept. 26, 1967

3,343,232
SELF-LUBRICATING PINS
Anthony C. Capparella, 559 E. Main St.
Norristown, Pa. 19401
Filed Jan. 21, 1966, Ser. No. 522,119
7 Claims. (Cl. 24—161)

This invention pertains to self-lubricating pins. More particularly, it pertains to a type of pin wherein lubricant is conducted to the pointed end of the pin's shank from a reservoir coupled thereto in order to reduce penetration friction as the pin is forced through layers of material.

Pins of varying types including straight pins, safety pins, diaper pins and the like have been in use for hundreds of years. Very frequently these pins are used in applications where they must be forced through layers of material and, despite the penetration effected by their pointed end, brute strength is often required. In many such applications a non-staining lubricant would materially reduce penetration friction. Yet, very often the user of the pin does not have a free hand nor a readily available supply of lubricant. Further, in the prior art, there is no suggestion of using a lubricant in connection with pins of these types.

Accordingly, it is an object of the invention to provide a pin having a longitudinally extending pointed shank with which is associated a reservoir for a lubricant and means for conducting lubricant from the reservoir to the pointed end.

It is a further object of the invention to provide safety pins, such as diaper pins, wherein there is a self-contained reservoir for a lubricant and wherein further means are provided for conducting lubricant from the reservoir to the point.

An additional object of the invention is to provide self-lubricating pins of the above type wherein the lubricant is stored in a reservoir having resilient walls and can be forced out of the reservoir by a slight pressure upon the walls thereof.

Still another object of the invention is to provide a self-lubricating pin containing an integral reservoir which can be filled, from time to time, with lubricant as dictated by the consumption thereof.

It is a further object of the invention to provide pins wherein penetration friction is reduced by supplying a lubricant proximate the point of the pin as the pin is forced through layers of fabric.

Among the other objects of the invention is the provision of a self-lubricating pin of the character described wherein the level of lubricant in the reservoir can be visually observed.

Other objects of the invention are to provide improved pins of the character described which are easily and economically produced, sturdy in construction and highly efficient in operation.

These and other objects of the invention will be apparent to those skilled in the art from the following detailed description of an embodiment thereof, when read in conjunction with the accompanying drawings, in which like reference numerals designate like parts and in which, further:

FIGURE 1 represents an elevation, partially cut-away, of a diaper pin embodying the invention.

FIGURE 2 represents a section taken along line 2—2 of FIGURE 1.

FIGURE 3 represents a section taken along line 3—3 of FIGURE 1.

Referring now to the drawings, it will be observed that the self-lubricating pin of the invention comprises a longitudinally extending shank A which is pointed at one end, a lubricant reservoir B, and means for conducting lubricant from the reservoir to the vicinity of the pointed end of the shank.

In the embodiment shown, which is in the form of a diaper pin, the shank A includes a first arm 10 and a second resilient arm 11. The proximal end of the second arm is connected, as by loop 12, to arm 10 and the distal end of arm 11 is pointed as at 13. Shank A is made of tubular material of sufficient strength to resist penetration forces and is of a material of construction which is compatible, from a corrosion viewpoint, with the lubricant which will be used. The various stainless steels are found particularly suitable but other ferrous and non-ferrous materials may also be used. Point 13 is formed in such a way as to include means for dispensing lubricant proximate the area of penetration. This may be achieved, for instance, by chisel grinding of the tubular arm or by providing a discharge port or eyelet 14 as shown in FIGURE 1.

In this embodiment, reservoir B, which is coupled to shank A, may most conveniently be incorporated into a housing, generally designated as 15. This housing includes a keeper portion 16 which consists of an entrance-way 17 and a groove or channel 18, which extends transversely across the housing at right angles to entrance-way 17. The channel is adapted to receive and retain the pointed end of arm 11, as in a conventional diaper pin. Reservoir B, in this instance an integral part of housing 15, is defined by sidewall 19, sidewall 20, and an internal, generally transverse partition 21. The reservoir may also be provided with a filler plug 22.

As best shown in FIGURE 2, the lower ends of walls 19 and 20 define the sides of channel 18. The housing may be made of any material which is corrosion-resistant to the lubricant but it is preferred to form walls 19 and 20 of resilient material so that, by application of external pressure thereto, the volume of the reservoir may be decreased to cause the application of hydraulic pressure to the contents thereof. Particularly suitable resilient materials include high density long chain polymers such as polyethylene and the like. Especially suitable are such materials in their translucent forms so that the level of lubricant in the reservoir can be readly observed. The base of the reservoir B terminates in a well or depression 23 and, at this point, first arm 10 is dependently mounted. As is apparent, the tubular arms 10 and 11 constitute a means for conducting lubricant from well 23 to port 14.

Operation of the pin is as follows. Plug 22 is removed and reservoir B is filled with a suitable supply of lubricant as indicated at 24. Lubricant 24 may be any suitable natural or synthetic oleaginous liquid such as, for example, mineral oil, baby oil, lotion, silicone formulations and the like. The only requirement is that the material have lubricating characteristics and a viscosity such that it will flow from well 23 through the dependent tubular arms 10 and 11 to the vicinity of point 13 with the existence of but a slight pressure gradient. Once the reservoir has been filled, the plug 22 is reinserted. As shown in FIGURE 2, this plug may be of the snap-fit type.

With point 13 exposed, the pin is then made to penetrate layers of fabric. At the same time, lubricant is forced out of reservoir B so that penetration friction is reduced. Once penetration has been achieved and the pin properly positioned, second arm 11 is shifted into retentive juxtaposition with the keeper by first springing arm 11 toward arm 10, so that point 13 enters entrance-way 17, and thereafter, upon the release of such pressure, arm 11 will move transversely along groove 18 and remain in retentive juxtaposition therewith. When the lubricant supply is depleted, reservoir B is refilled with lubricant.

While I have, in the foregoing specification, described a diaper pin embodying the invention, it should be clearly understood that this description has been merely exemplary of many modes of embodying the invention in that the invention may be variously embodied in different types of pins. Consequently, the extent of the invention is to be determined by the scope and the spirit of the claims which follow.

Having thus described my invention, I claim:

1. A self-lubricating pin comprising a shank pointed at one end, a keeper, said shank having a first arm fixedly mounted with respect to said keeper and a second resilient arm whose proximal end is connected to said first arm and whose distal end is pointed, said second arm being shiftable into and out of retentive juxtaposition with said keeper, said first and second arms being tubular, a reservoir for a lubricant coupled to said shank, said lubricant being flowable through said arms toward said point whereby penetration friction of said point is materially reduced.

2. The pin of claim 1 wherein said first arm is dependent from said reservoir.

3. The pin of claim 2 wherein said reservoir is provided with means for replenishing the supply of lubricant therein.

4. The pin of claim 3 wherein said reservoir is made of resilient material which is impermeable to the lubricant contained therein.

5. The pin of claim 1 wherein said keeper and said reservoir are integral parts of a unitary housing from which said first arm is dependent.

6. The pin of claim 5 wherein said first and second arms are tubular and are connected to said reservoir to comprise a conduit for lubricant contained therein.

7. The pin of claim 6 wherein the reservoir portion of said housing is made of resilient material impermeable to the lubricant contained therein, flexure of said reservoir causing lubricant to be displaced from said reservoir.

References Cited

UNITED STATES PATENTS

| 1,774,083 | 8/1930 | Colby. | |
|---|---|---|---|
| 2,371,086 | 3/1945 | Matson et al. | 128—216 |
| 2,744,528 | 5/1956 | Barrett et al. | 128—216 |
| 2,911,972 | 11/1959 | Elinger | 128—216 |

WILLIAM FELDMAN, *Primary Examiner.*

DONALD A. GRIFFIN, *Examiner.*